United States Patent Office 2,740,736
Patented Apr. 3, 1956

2,740,736

MODIFIED MELAMINE-FORMALDEHYDE RESIN

Curtis Elmer and Thomas Anas, Springfield, and Stuart H. Rider, Longmeadow, Mass., assignors to Monsanto Chemical Company, St. Louis, Mo., a corporation of Delaware No Drawing. Application July 6, 1954,
Serial No. 441,672

8 Claims. (Cl. 154—43)

This invention relates to melamine-formaldehyde resins. More particularly, the invention relates to modified melamine-formaldehyde condensates having improved flow.

Condensates of melamine with formaldehyde are used extensively as molding powders and as laminating resins. They are particularly desirable for their high gloss, lack of inherent color and chemical resistance. One obstacle to an even greater popularity of these materials is their relatively poor flow characteristics under economical processing conditions.

One object of this invention is to modify melamine-formaldehyde condensates.

A further object is to provide melamine-formaldehyde condensates having increased flow without detracting from the inherent qualities of the condensates.

Another object is to provide laminates at least the topmost layer of which is impregnated with and bonded to the remainder of the laminate with a modified melamine-formaldehyde resin having increased flow.

These and other objects are attained by reacting melamine with formaldehyde and from 0.0006 to 0.006 mol. of ammeline, ammelide, cyanuric acid, or mixtures thereof, per mol. of melamine.

The following examples are given in illustration and are not intended as limitations on the scope of this invention. Where parts are mentioned, they are parts by weight.

EXAMPLE I

Disperse 126 parts (one mol) of melamine, 202 parts (about 2.5 mols) of Formalin (37% formaldehyde), and 0.5 part (about .004 mol) of ammeline in 60 parts of water and adjust the pH of the dispersion to about 8.5 with sodium hydroxide. Heat the dispersion with constant agitation at reflux temperature and atmospheric pressure until a 25% water-dilutability point is obtained. Cool and filter.

The product is an aqueous solution of a co-condensation product of melamine, ammeline and formaldehyde. The condensation product may be recovered from the solution by conventional drying methods such as spray drying, oven drying, etc. The dried resin can be molded under the normal molding conditions for unmodified melamine-formaldehyde resins but the molding time may be reduced due to the increased flow of the resin at the molding temperature. Rejects for incomplete filling of the mold are substantially eliminated using this resin.

The relative flow properties of laminating syrups are tested by a simple procedure which simulates practical operating conditions. The procedure is as follows:

Impregnate paper by dipping it into the laminating syrup, withdrawing the paper slowly from the syrup, and wiping away excess impregnant with a scraper bar. The resin pickup on a solids basis should be from 60 to 65% by weight of the paper. Any type of paper normally used in the laminating industry may be used, including rayon rag stock, alpha cellulose stock, etc. The impregnated paper is then dried at elevated temperatures without substantially advancing the cure of the resin.

The impregnated paper is then cut into a plurality of 1⅝ inch circular pieces. Twelve of the pieces are superimposed to form a stack. The stack is weighed and then laminated under a pressure of 1000 p. s. i. at 150° C. for 3 minutes. Cool the laminate and cut off the flash, i. e., the resin that has flowed out beyond the periphery of the laminate. Obtain the weight of the flash by weighing the trimmed laminate and subtracting its weight from that of the original stack. The percent flow is calculated by dividing the weight of the flash by the weight of the unpressed stack.

Since it is difficult to duplicate conditions exactly from day to day, a blank or control sample should always be run simultaneously with the resin to be tested.

Table I sets forth the results obtained with the reaction product of Example I at three different volatiles (moisture) contents as compared with results obtained with an unmodified melamine-formaldehyde condensate.

*Table I*

|  | A | B | A | B | A | B |
|---|---|---|---|---|---|---|
| Percent Volatiles | 6.2 | 6.8 | 5.2 | 5.1 | 4.5 | 4.7 |
| Percent Flow | 26.7 | 17.2 | 9.1 | 1.4 | 2.3 | 0.8 |

A is the ammeline-modified melamine-formaldehyde resin of Example I.
B is the unmodified melamine-formaldehyde resin.

It can be seen from Table I that the flow of the resin in the laminate made from the resin containing ammeline is much greater than that of the unmodified resin at substantially equal volatile content. Since it is commonly known that reduced volatile content improves all important properties of a paper laminate, but that sufficient flow is also of importance, it can be seen that the resins of this invention will enable the production of laminates with improvements exhibited as increased abrasion resistance, improved dimensional stability, lower water absorption, better gloss, and others.

EXAMPLE II

Prepare resins as in Example I except replace the ammeline of Example I with ammelide, cyanuric acid, and a mixture of cyanuric acid and ammelide in which the ammelide constitutes about 20% by weight of the mixture. Prepare laminates from the resins according to the flow test procedure described above. The results obtained are shown in Table II.

*Table II*

| Resin | Percent Volatiles | Percent Flow |
|---|---|---|
| C | 5.0 | 12.0 |
| D | 5.2 | 17.1 |
| E | 5.1 | 10.3 |
| B | 5.1 | 1.4 |

Resin C contains 0.006 mol of ammelide.
Resin D contains 0.002 mol of cyanuric acid.
Resin E contains 0.003 mol of the cyanuric acid-ammelide mixture.

The resins of this invention are melamine-formaldehyde resins modified with ammeline, ammelide, cyanuric acid, or mixtures thereof. Based on melamine, the formaldehyde should be restricted to from 2 to 4 mols and the ammeline, ammelide, cyanuric acid, or mixtures thereof to from 0.0006 to 0.006 mol per mol of melamine.

The formaldehyde is most conveniently used in the form of formalin which is a 37% aqueous solution of formaldehyde. Pure formaldehyde or its polymers, paraformaldehyde and trioxymethylene, may be used.

The reaction should be carried out in an aqueous medium at a pH of 8–10. Conveniently, the temperature of the reaction is reflux temperature at atmospheric pressure. Temperatures as much as 50° C. below reflux may be used, especially where low molecular products are desired. The end point of the reaction is the 25% water-dilutability point by which is meant that the reaction product may be diluted with water to 25% solids at 25° C. without precipitating the resin.

The amount of water is not critical since any excess may be removed at the end of the reaction by conventional drying means. Where the products are to be used as laminating resins, it is convenient to use the amount of water desired in the final product, i. e., from 40 to 60% water by weight.

The amount of resin used in paper laminates will vary according to the properties desired, i. e., from 35 to 70% by weight of the paper.

The resins of this invention can be cured to an insoluble infusible state by heating at temperatures between 130 and 160° C., preferably under substantial pressure. The physical and chemical properties of the cured resin are equivalent to cured unmodified melamine-formaldehyde resins.

Due to the light color of these resins, they are particularly valuable for use in preparing decorative laminates in which a decorative surface sheet is laminated to a solid or laminated core. Most frequently, the core consists of a laminate made from a plurality of paper plies bonded with a thermosetting resin such as, for example, a phenolic resin or an alkyd resin. In some cases, the core is a solid block of wood and in others it is the so-called hardboard which comprises woodwaste bonded with a thermosetting resin under high pressure. The decorative sheet may be of paper, or various textile materials such as cotton, glass, nylon, vinyl resin, etc. fabrics.

For example, a decorative laminate may be prepared as follows:

Impregnate eight sheets of kraft paper with a standard phenolic laminating varnish. Impregnate one sheet of bleached kraft paper having a design printed thereon with the syrup of Example I. Impregnate a second sheet of bleached kraft paper carrying no design with the syrup of Example I. Dry the impregnated sheets to remove excess volatiles. Superimpose the eight sheets one on another to form an initial assembly. Place the printed sheet on top of the initial assembly and the unprinted sheet on top of that. Laminate the assembly under 1000 p. s. i. pressure at 150° C. for 30 minutes. The product is an attractive laminate, the topmost surface of which displays the decorative print unmarred by color due to the laminating resin and having superior gloss and abrasion resistance.

In decorative laminates of this type, the topmost layer is thin enough to be substantially transparent after laminating and serves as extra protection for the printed surface.

What is claimed is:

1. A co-condensation product of one mol of melamine, from 2 to 4 mols of formaldehyde and from 0.0006 to 0.006 mol of a material taken from the group consisting of ammeline, ammelide, cyanuric acid and mixtures thereof.

2. A product as in claim 1 wherein the material is ammeline.

3. A product as in claim 1 wherein the material is ammelide.

4. A product as in claim 1 wherein the material is cyanuric acid.

5. A product as in claim 1 wherein the material is a mixture of cyanuric acid and ammelide in which the ammelide constitutes about 20% by weight of the mixture.

6. A process for preparing high flow melamine resins which comprises reacting one mol of melamine with from 2 to 4 mols of formaldehyde and from 0.0006 to 0.006 mol of a material taken from the group consisting of ammeline, ammelide, cyanuric acid and mixtures thereof at a pH of from 8 to 10 and a temperature ranging from reflux temperature to 50° C. below reflux temperature at atmospheric pressure.

7. A laminate comprising a plurality of laminae impregnated and bonded with a co-condensation product of one mole of melamine, from 2 to 4 mols of formaldehyde and from 0.0006 to 0.006 mol of a material taken from the group consisting of ammeline, ammelide, cyanuric acid and mixtures thereof, said co-condensation product having been cured in situ in the laminate to an insoluble, infusible state under heat and pressure.

8. A laminate comprising a plurality of laminae at least the topmost layers of which are impregnated and bonded with a co-condensation product of one mol of melamine, from 2 to 4 mols of formaldehyde and from 0.0006 to 0.006 mol of a material taken from the group consisting of ammeline, ammelide, cyanuric acid and mixtures thereof, said co-condensation product having been cured in situ in the laminate to an insoluble infusible state under heat and pressure.

No references cited.